United States Patent
Kaufmann et al.

(10) Patent No.: US 9,182,214 B2
(45) Date of Patent: Nov. 10, 2015

(54) METHOD AND CIRCUIT ARRANGEMENT FOR CHECKING THE ROTOR POSITION OF A SYNCHRONOUS MACHINE

(75) Inventors: Tom Kaufmann, Ippenschied (DE); Peter Stauder, Mainz (DE); Christian Bitsch, Heppenheim (DE); Bogdan Budianu, Iasi (RO); Jochen Leideck, Darmstadt (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 261 days.

(21) Appl. No.: 13/814,324

(22) PCT Filed: Jul. 28, 2011

(86) PCT No.: PCT/EP2011/063055
§ 371 (c)(1),
(2), (4) Date: Feb. 5, 2013

(87) PCT Pub. No.: WO2012/016914
PCT Pub. Date: Feb. 9, 2012

(65) Prior Publication Data
US 2013/0134967 A1 May 30, 2013

(30) Foreign Application Priority Data
Aug. 5, 2010 (EP) .................................. 10464007

(51) Int. Cl.
*G01B 7/14* (2006.01)
*H02P 6/18* (2006.01)
*H02P 6/22* (2006.01)

(52) U.S. Cl.
CPC *G01B 7/14* (2013.01); *H02P 6/185* (2013.01); *H02P 6/22* (2013.01)

(58) Field of Classification Search
CPC ................................ G01R 31/34; G01R 25/00
USPC ..................................................... 324/207.25
See application file for complete search history.

(56) References Cited

U.S. PATENT DOCUMENTS

| 4,565,957 A * | 1/1986 | Gary et al. ..................... 318/723 |
| 6,826,499 B2 * | 11/2004 | Colosky et al. ................. 702/85 |

(Continued)

FOREIGN PATENT DOCUMENTS

| DE | 102 15 428 A1 | 10/2003 |
| DE | 10 2008 001 408 A1 | 10/2009 |

(Continued)

OTHER PUBLICATIONS

PCT International Search Report—Nov. 29, 2012.

*Primary Examiner* — Tung X Nguyen
*Assistant Examiner* — Alesa Allgood
(74) *Attorney, Agent, or Firm* — Brinks Gilson & Lione

(57) ABSTRACT

An electronically-commutated synchronous system and method includes a permanently-excited rotor and a stator which is provided with three phase windings, together with three rotor position sensors in an appropriate arrangement for a first commutation scheme. The rotor position is determined by the read-out of data from the position sensors. The appropriate voltage vector is defined by a second commutation scheme, and the second rotor position thus determined is compared with the first commutation scheme. If the rotor position sensors are operating correctly, the position of the rotor may be determined to an accuracy which is equivalent to the interval between two columns in the commutation table.

20 Claims, 3 Drawing Sheets

(56) References Cited

U.S. PATENT DOCUMENTS

| | | | |
|---|---|---|---|
| 7,064,504 B2* | 6/2006 | Imai et al. | 318/400.04 |
| 7,915,888 B2* | 3/2011 | O'Gorman et al. | 324/207.2 |
| 7,956,561 B2* | 6/2011 | Kanamori et al. | 318/400.06 |
| 8,508,214 B2* | 8/2013 | Kutzner et al. | 324/105 |
| 2003/0173946 A1* | 9/2003 | Liu et al. | 324/107 |
| 2004/0085064 A1* | 5/2004 | Benchaib et al. | 324/207.25 |
| 2005/0007051 A1* | 1/2005 | Lelkes | 318/439 |
| 2006/0119365 A1* | 6/2006 | Makhija | 324/380 |
| 2008/0297079 A1* | 12/2008 | Kanamori et al. | 318/400.06 |
| 2009/0259419 A1* | 10/2009 | Kasai | 702/63 |
| 2010/0314566 A1* | 12/2010 | Huerta-Ochoa et al. | 251/129.11 |

FOREIGN PATENT DOCUMENTS

| | | |
|---|---|---|
| EP | WO 2005/040641 A1 | 5/2005 |
| EP | 1 612 927 A1 | 1/2006 |

\* cited by examiner though non-absolute position sensor. In off-load synchronous machines, for the elimination
METHOD AND CIRCUIT ARRANGEMENT FOR CHECKING THE ROTOR POSITION OF A SYNCHRONOUS MACHINE

CROSS-REFERENCE TO RELATED APPLICATIONS

This application claims priority to European Patent Application No. 10464007.3, filed Aug. 5, 2010 and PCT/EP2011/063055, filed Jul. 28, 2011.

FIELD OF THE INVENTION

The invention relates to a method and to a circuit arrangement for checking the rotor position of a synchronous machine.

BACKGROUND AND SUMMARY OF THE INVENTION

Electronically-commutated synchronous machines with a permanently-excited rotor and a stator provided with phase windings, also known as brushless dc motors, enjoy great popularity. They are characterized by low wear, and by their limited electromagnetic or acoustic interference, and show a high degree of efficiency. The influx of current to typically three stator windings generates a magnetic field, in which the permanently-excited rotor in arranged. By the appropriate switchover (commutation) of the currents flowing in the stator windings (or of voltages applied), a rotary motion is generated. Electronically-commutated motors are also used as drive mechanisms for electromechanically-actuated wheel brakes of a motor vehicle, wherein an appropriate linkage mechanism converts the rotary motion of the motor into a translational motion of the brake linings. For the purposes of such application, motors are designed with a high torque rating at rest or at low speeds of rotation.

In order to achieve electronic commutation of the motor, the position of the rotor must be known; for a motor at rest, or a motor rotating at low speed, the rotor position may be appropriately determined by means of sensors. In a widely-applied arrangement, three Hall-effect sensors fixed to the stator are used for the scanning of a rotary encoder associated with the rotor, or for the direct scanning of the stray field of the rotor magnets.

WO 2005/046041 A2 describes a method for the operation of a synchronous machine with a permanently-excited rotor, a stator provided with phase windings and a non-absolute position sensor, whereby the rotor start position is determined. In off-load synchronous machines, for the elimination of angle errors in the determination of the rotor start position, a minimum of one current and/or voltage vector is delivered in the direction of the determined rotor position for a specific time interval, thereby forcing the arrangement of the rotor to the position concerned. Although this method permits the elimination of minor angle errors, it does not permit the reliable detection of a defective sensor.

If the rotor position detected by the sensors is not consistent with the actual rotor position, malfunctions of various types may ensue. In many cases, this may result in damage to the motor, the driven device or the motor control system.

Accordingly, the object of the present invention is to verify the operation of the rotor position sensors and, in case of the correct operation of the sensors, to detect any deviation between the actual rotor position and that indicated by the sensors, and to generate an angular correction for the control of the motor.

This object is fulfilled by the method according to this invention.

A method is therefore provided in accordance with this invention wherein the relative position of the rotor of an electronically-commutated synchronous machine to one or more, specifically three rotor position sensors which are fixed to the stator is determined. After a first rotor position determination process, the off-load rotor is rotated through a pre-defined angle by the application of an appropriate voltage vector. Thereafter a further rotor position determination process is carried out, and the result of the second rotor position determination process is compared with an anticipated rotor position. After the first position determination process, during rotation through a fixed electrical angle, e.g. 60°, an anticipated rotor position may be determined. In case of the coincidence of the anticipated and measured second rotor position, the positional error lies below the angular resolution defined by the number and position of the rotor position sensors in the rotor position sensor system.

Preferably a first commutation scheme is specified, whereby an association between the voltage vector applied and the anticipated rotor position is established. If a commutation scheme is specified, the anticipated rotor position may be determined by means of a simple read-out from the commutation table.

It is advantageous if the association between the current rotor position and the voltage vector to be applied for the achievement of a desired rotation is determined by means of a specified first commutation scheme. In a specified commutation scheme, rotation through a specific angle may be achieved to an accuracy which is determined by the arrangement and number of sensors, by the application of a voltage vector which differs from the commutation table by an angle-related number of columns.

Preferably, by reference to the comparison between the result of the second rotor position determination process and the anticipated rotor position, all subsequently determined rotor positions and derived variables, including e.g. the instantaneous speed of rotation, are corrected. Should any displacement in the rotor position be detected by the rotor position sensors during the subsequent commutation of the motor, the highest possible mechanical torque will continue to be delivered.

During the determination of the rotor position, the currents flowing in the phase windings are subject to appropriate limitation on the basis of temperature information. Specifically, in case of a higher temperature, a higher limiting current is selected and, in case of a lower temperature, a lower limiting current is selected. At a higher temperature, the reduced magnetization of the permanently-excited rotor is offset by a correspondingly increased current flow in the stator windings. The coil currents may be selected to a sufficiently high rating to permit the execution of the method according to the invention. As a result of the limited torque delivered, the risk of any damage to the motor or the driven device is minimal.

During the determination of the rotor position, it is advantageous if the currents flowing in the phase windings are limited by the alternating cut-in and cut-out of the voltages applied to the phase windings. This permits current limitation, even where the control electronics of the motor include no provision for pulse-width modulation.

In a specifically preferred form of embodiment of the invention, the electronically-commutated synchronous machine is provided with a permanently-excited rotor and a stator which is provided with three phase windings, together with three rotor position sensors in an appropriate arrangement for a first commutation scheme. The rotor position is determined by the read-out of data from the position sensors, the appropriate voltage vector is defined by a second commutation scheme, and the second rotor position thus determined is compared with the first commutation scheme. If the rotor position sensors are operating correctly, the position of the rotor may be determined to an accuracy which is equivalent to the interval between two columns in the commutation table.

In a particularly preferred form of embodiment of the invention, rotor positions are expressed as angles, wherein 360° represents one complete cycle of a commutation scheme and, after the comparison of the second determined rotor position with the first commutation scheme, a voltage vector with an angular displacement of 90° in the first commutation scheme is applied, whereafter a voltage vector in the second commutation scheme at an angle displaced by a further 90° in the same direction is applied, and a third rotor position is determined thereafter, whereby an error is detected if the data from the position sensors for the third rotor position are not inverted in relation to the data for the second rotor position. If these data are inverted, the correct operation of all the rotor position sensors is confirmed.

According to an alternative and particularly preferred form of embodiment of the invention, at least one further voltage vector, adjoining in the opposite direction of rotation, of the second commutation scheme is applied thereafter, and a third rotor position is determined thereafter, whereby an error is detected if the data from the position sensors for the third rotor position do not differ from the data for the second rotor position.

In a particularly preferred arrangement, the electronically-commutated synchronous machine is provided with a permanently-excited rotor and a stator which is provided with three phase windings, together with three rotor position sensors in an appropriate arrangement for a commutation scheme. Prior to the initial determination of a rotor position, a base voltage vector for the commutation scheme is applied, the rotor position is determined by the read-out of data from the position sensors, the appropriate voltage vector is varied in relation to the base voltage vector by specific increments, and the second determination of the rotor position, together with the adjustment of the appropriate voltage vector, are continued progressively until an adjoining rotor position is indicated. This method permits the more accurate determination of the rotor position or of the switchover point of the rotor position sensors.

In a particularly preferred arrangement, the rotor position sensors operate on the basis of the Hall effect; the incremental variation of the voltage vector and the read-out of data from the position sensors are repeated, whereby the desired rotor position is achieved, in both running directions of the motor, by the application of the base voltage vector, the existing voltage vectors at the time of a change to the data from the position sensors are compared with the base voltage vector, and a resulting measure is calculated for the hysteresis of the position sensor operating by the Hall effect, the data read-outs for which have changed.

Specifically, the hysteresis of all position sensors operating by the Hall effect is determined by the application of a base voltage vector which is adjacent to the relevant switchover point, and the repeated incremental variation of the voltage vector with a simultaneous read-out from the position sensor concerned.

In a particularly preferred arrangement, the switchover positions of the rotor position sensor(s) concerned, which are adjusted in relation to the base voltage vector, are considered by the application of appropriate adjustments to the subsequent control of the electronically-commutated synchronous machine whereby, specifically, a positional difference and/or hysteresis is logged and taken into consideration for each rotor position sensor in question.

In a particularly preferred arrangement, the appropriate voltage vectors are set by the use of known vector modulation methods, whereby dead-time effects in particular are compensated by the appropriate adjustment of the relevant pulse duty factor. Dead-time effects are generated by the requisite time delay associated with the connection of a rectifier bridge, in order to prevent any short-circuit. By the adaptation of the pulse duty factor, i.e. the ratio of the pulse width to the pulse interval, the generation of a voltage vector with a defective angle can be avoided.

According to an alternative, particularly preferred form of embodiment of the invention, the appropriate voltage vectors are varied by the adjustment of one of the voltages applied, by means of the pulse duty factor.

In a further particularly preferred form of embodiment of the invention, the appropriate voltage vectors are generated by means of rapid switchover between adjacent base voltage vectors.

It is particularly expedient if a limitation of current is effected by the repeated and short-term input of zero vectors. Under zero vector conditions, all windings are at the same potential, such that no voltage difference is generated.

The invention also relates to a circuit arrangement for the control of an electronically-commutated synchronous machine, which executes a method whereby the position of the rotor of an electronically-commutated synchronous machine relative to one or more, specifically three rotor position sensors which are fixed to the stator is determined and which, specifically, is a constituent element of a circuit arrangement for the control or regulation of the brakes of a motor vehicle.

Appropriately, on-load operation of the motor proceeds only after the error-free execution of a method whereby the position of the rotor of an electronically-commutated synchronous machine relative to one or more rotor position sensors is determined whereby, specifically, the control system considers any difference detected between the actual and notional position of the rotor.

The invention also relates to the use of a circuit arrangement of this type in motor vehicles.

The currents flowing in the stator windings are preferably limited, specifically for the prevention of damage to the motor or the driven device.

In a particularly preferred arrangement, current limitation is achieved by the limitation of the voltage applied, specifically by means of pulse width modulation in the control circuit.

In a further and particularly preferred form of embodiment of the invention, the flow of current is subject to near-total interruption when a temperature threshold is exceeded.

BRIEF DESCRIPTION OF THE INVENTION

Further preferred forms of embodiment are disclosed herein, and in the following description of one exemplary form of embodiment, with reference to figures, in which.

DETAILED DESCRIPTION OF THE INVENTION

Figure 1:
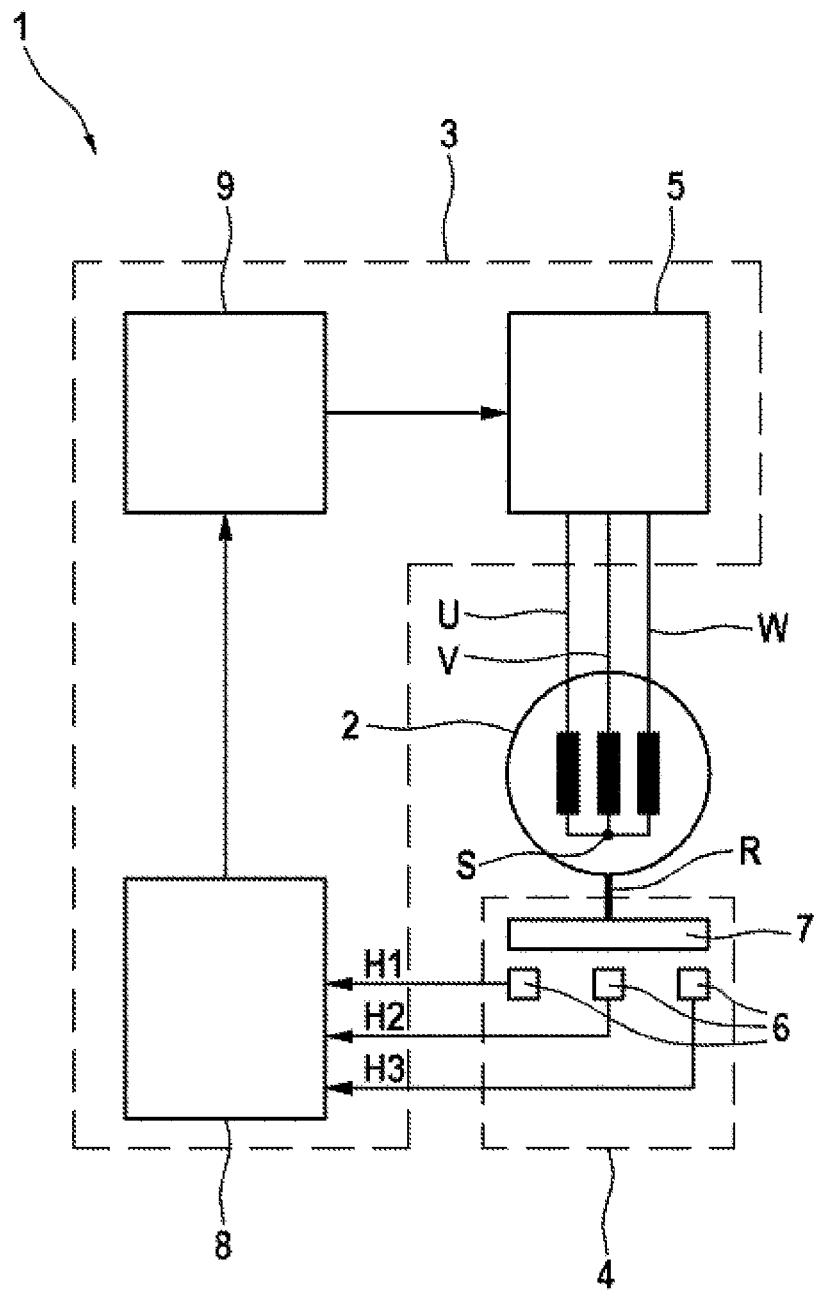
FIG. 1 shows a schematic overview of an electronically-commutated synchronous machine.

As represented in FIG. 1, an electronically-commutated synchronous machine 1 comprises an electromechanical energy converter 2, an electronic control device 3 and a rotor position sensor system 4. In addition to the use thereof as a drive mechanism, operation as a generator is also possible, whereby mechanical motion is converted into electrical energy accordingly. The stator is typically comprised of three phase windings, designated as U, V and W, which meet at a star point S. In principle, the delta connection of the phase windings would also be possible. The permanently-excited rotor is connected to a magnetic rotary encoder 7 via a bearing-mounted rotor shaft R. The magnetic field of the rotary encoder is scanned by digital Hall sensors 6. These sensors 6 will be enabled e.g. when they are located in the field of a magnetic north pole, and will conduct no current when a magnetic south pole is in the immediate vicinity. Hall switches of this type have a hysteresis, as a result of which the switchover will only proceed with effect from the presence of a specific minimum magnetic field. The information signals H1, H2, H3 from the typically three Hall sensors are processed by a circuit for the determination of the rotor position 8. By reference to the electrical angle, which is expressed as the rotor position, a control circuit 9 determines the voltage vector to be applied to the phase windings U, V, W of the stator, and controls the semiconductor circuit of the inverter bridge 5 accordingly. The electronic control facility may be implemented, either in whole or in part, in the form of a program executed by a micro-controller.

Figure 2:
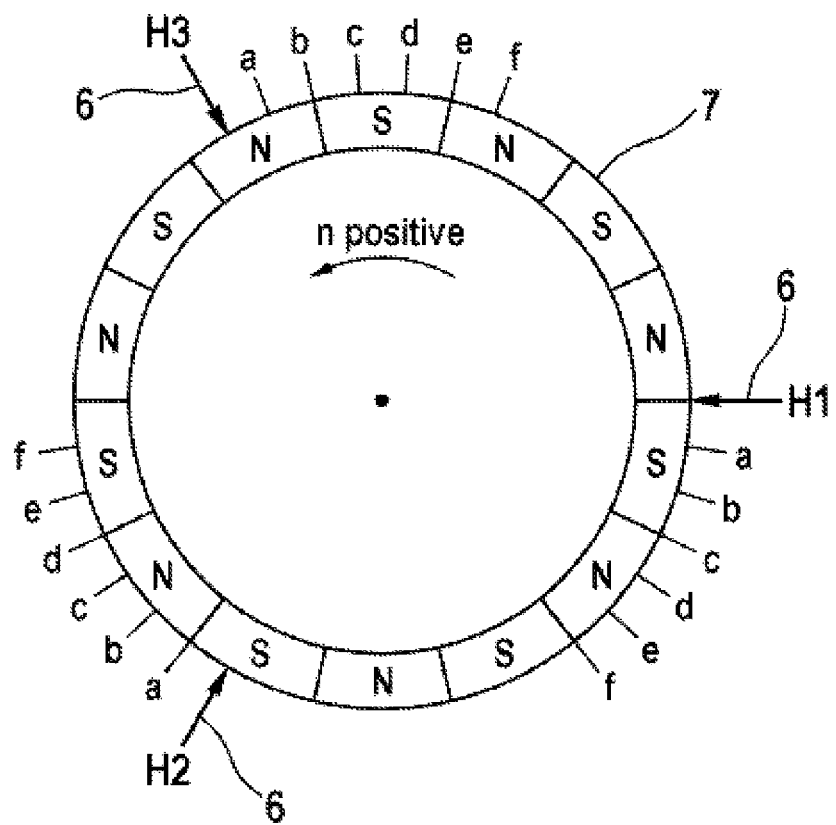
FIG. 2 shows an exemplary arrangement of the Hall sensors and the rotary encoder.

The geometry of the rotary encoder and the Hall sensors is represented in FIG. 2, in which the axis of rotation projects from the plane of the paper. The three sensors fixed to the stator are arranged such that, upon the rotation of the rotor through respective intervals of 60° of the electrical angle, one sensor respectively will change its output state. The relationship between the electrical and the mechanical angle may be defined by the following formula:

$$\phi_{el} = \phi_{mech} \cdot p$$

where $\phi_{el}$ is the electrical angle, $\phi_{mech}$ is the mechanical angle and p is the number of pole pairs. Accordingly, if the rotor is configured as an appropriately mounted bar magnet, the electrical and mechanical angles would be equal whereas, in the case represented, where p=7, the mechanical angles are significantly smaller than the electrical angles. Rational arrangements of the three Hall sensors are associated with electrical angle differences $\Delta\phi_{Sensor\_el}$ between the sensors of:

$$\Delta\phi_{Sensor\_el} = 120° + n \cdot 360°,$$

where n is a whole number; this indicates how frequently the applicable commutation scheme will need to be applied, in order to move the rotor from the position of the first sensor considered to the next.

If the rotor rotates counter-clockwise and the sensors are positioned as indicated, the relative positions indicated will proceed from a to f; the Hall sensors deliver the signals shown in the table (N: north pole of the sensor, S: south pole of the sensor):

|    | Position |   |   |    |   |   |
|----|---|---|---|----|---|---|
|    | a | b | c | Dd | e | f |
| H1 | S | S | S | N  | N | N |
| H2 | S | N | N | N  | S | S |
| H3 | N | N | S | S  | S | N |

Position f corresponds to the starting position, i.e. the sensor signals and the commutation scheme are repeated upon the completion of a 360° electrical angle, which corresponds to the mechanical angle of a pole pair. Accordingly, the three Hall sensors 6 deliver absolute electrical angles of exactly 60°.

Which voltages must be applied for the achievement of a specific orientation of the magnetic field vector may be defined by reference to a commutation scheme. A specific combination of voltages to be applied to the phase windings is described as a voltage vector or as a base voltage vector, when the voltages concerned correspond exactly to those applied in accordance with a block commutation scheme, in which only specific discrete voltage values occur.

Figure 3:
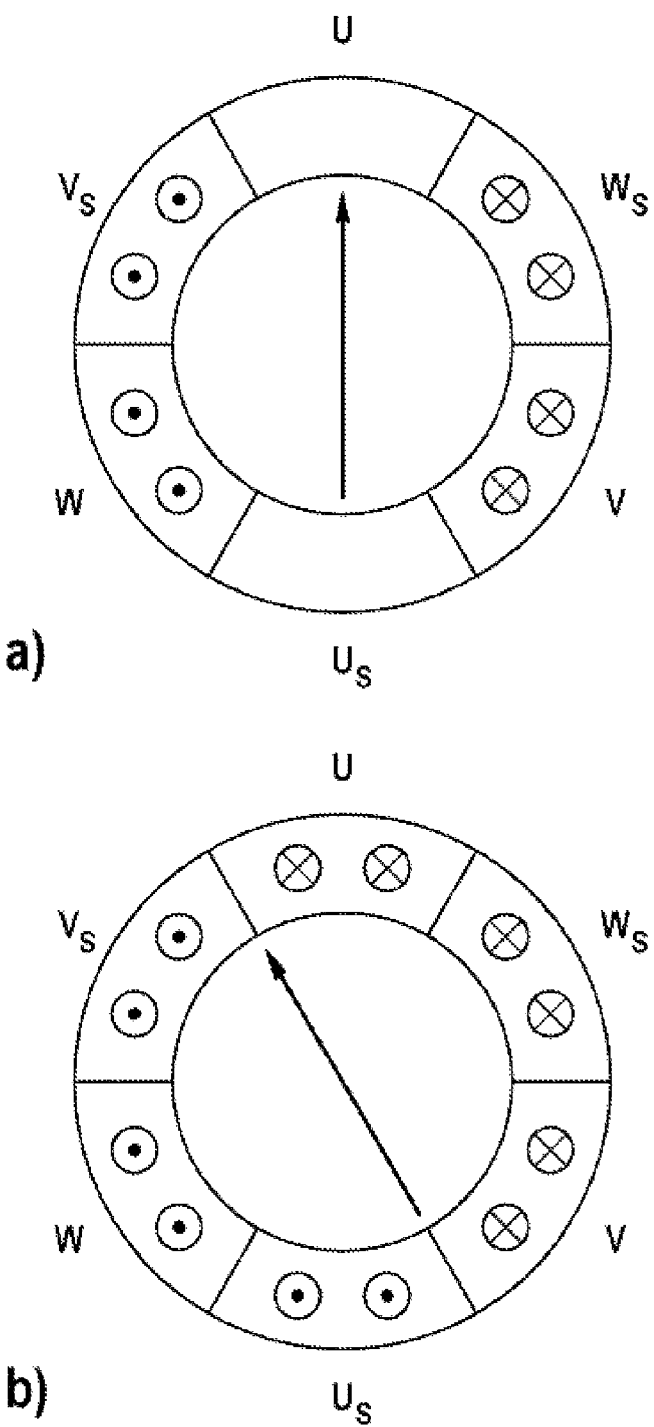
FIG. 3 shows a position of magnetic field vectors associated with the application of a base voltage vector for 120°- and 180°-block commutation.

FIG. 3a) and b) show a schematic cross-section of the motor, perpendicular to its axis of rotation, in which the three phase windings are connected to the inverter bridge at the points U, V and W, and the second ends of each winding Us, Vs and Ws are star-connected. Current flowing in the plane of the paper is indicated by a cross, while current flowing out of the plane of the paper is indicated by a dot; the magnetic field vector is shown by an arrow. 120°-block commutation represents a conventional commutation scheme, in which a positive (+) supply voltage is applied to one phase, and a negative (−) supply voltage is applied to one phase, while the third phase is either not connected or is at a mean potential (0). The geometry associated with the application of an exemplary base voltage vector in 120°-block commutation is represented in FIG. 3a); in this arrangement, the off-load rotor would orient itself to the magnetic field vector within a short time. If the Hall sensors 6 are arranged as shown in FIG. 2, they will indicate position f; any further slight counter-clockwise rotation causes a switchover of the first Hall sensor, with a resulting change to the signal H1. This switchover of the Hall sensor signals to the control electronics that a switchover to the adjoining base voltage vector for an electrical angle between 60° and 120° is required, in order to ensure counter-clockwise rotation with the delivery of a high torque.

The corresponding base voltage vectors associated with the various positions or electrical angles are shown in the following commutation table:

|       | Position |   |   |   |   |   |
|-------|---|---|---|---|---|---|
|       | a | b | c | d | e | f |
| U_120 | + | + | 0 | − | − | 0 |
| V_120 | 0 | − | − | 0 | + | + |
| W_120 | − | 0 | + | + | 0 | − |
| U_180 | + | + | − | − | − | + |
| V_180 | − | − | − | + | + | + |
| W_180 | − | + | + | + | − | − |

U_120, V_120 and W_120 represent the voltages to be applied to the phases U, V and W respectively in 120°-block commutation. The table also shows the base voltage vectors in 180°-block commutation adjoining counter-clockwise with a 30° electrical angle in each case; for position f, the corresponding geometry is represented in FIG. 3b). The off-load rotor orients itself to the magnetic field vector adjoining at an electrical angle of 30° and, accordingly, is positioned exactly between two commutation positions in 120° block commutation. For 180°-block commutation, the Hall sensors 6 would therefore need to be rotated through an electrical angle of 30°.

Accordingly, there are two customary block commutation schemes, in which current is fed to two phase windings (120°-block commutation) or three phase windings (180° block commutation) respectively, and three Hall sensors 6 are used for the determination of the rotor position, wherein the sensors between the two schemes are rotated through an electrical angle of 30°. If the sensors are arranged for 120° block commutation, the magnetic poles, upon the application of a 180° base voltage vector, assume an exactly central position in front of the sensors, for which reason the resulting levels indicated by the Hall sensors must be clearly classifiable in the commutation table. Correspondingly, when the sensors are arranged for 180° block commutation, the application of a 120° base voltage vector will result in the generation of a clearly classifiable signal of the sensors.

Accordingly, in a sensor arrangement according to one of the two block commutation schemes, the application of a base voltage vector for the other block commutation scheme will generate clear sensor signals. The current angle error corresponds to an electrical angle of 30°—in the case of seven pole pairs, this represents a mechanical angle of approximately 4.3°. Any tolerance in the magnetization of the rotary encoder is ignored here; in most cases, this tolerance is of significantly smaller magnitude.

In an electronically-commutated motor, if the position of the stator is displaced in relation to the sensor elements, or the rotary encoder is off-center in relation to the rotor, this will result in an error in the rotor position determined on the basis of sensor data. Were the motor to be commutated with the rotor position displaced through an electrical angle of $\Delta\phi_{error}$, malfunctions of various types would result:

Where $0 \leq \Delta\phi_{error} \leq 60°$, the motor would be commutated prematurely in one direction of rotation and with a corresponding time delay in the other, as a result of which the motor characteristic, or the mechanical torque associated with the relevant speed of rotation, differs according to the direction of running. In motors without reluctance torque, the maximum static torque, i.e. the maximum torque delivered by the static rotor, is reduced.

Where $\Delta\phi_{error} \approx 90°$, the magnetic field would lie virtually parallel or anti-parallel to the rotor, the static torque delivered is close to zero, and the torque direction is no longer clear.

Where $\Delta\phi_{error} > 120°$, the torque direction would be reversed, i.e. the motor rotates in the opposite direction to that desired. Any overriding rotational speed regulator would continue to increase its setpoint value, until the maximum upper limit is reached.

In order to exclude any severe malfunctions, and specifically any damage to the motor or the driven device, a check of the sensor system upon the start-up of the system may be required. The method according to the invention may be applied to all systems in which off-load operation of the motor is possible.

If the sensor system is configured for 120° block commutation, and a base voltage vector for 180° block commutation is applied to the off-load rotor for a specific time interval, the rotor orients itself such that the levels of the Hall sensors must be clearly classifiable in the commutation table. In this case, the sensors or rotary encoder are rotated in relation to their notional position by an electrical angle of less than 30°. In the course of this check, the rotor rotates through an electrical angle not exceeding 60°+/−30°.

In order to test the operation of the Hall sensors, and specifically to exclude the constant indication of either N or S, the data from the Hall sensors may be subject to buffer storage and the rotor rotated through a further electrical angle of 180°, whereby a 120° base voltage vector displaced through an angle of 90° is applied in the first instance, followed by a 180° base voltage vector displaced through a further 90°. The Hall sensors must then indicate inverted data. If N is buffered for a sensor and, after rotation, the read-out is S, the Hall sensor concerned is operating as expected. Accordingly, from the read-out of all sensors, it is possible to check both the entire sensor system and the off-load status of the rotor.

Alternatively, a check of the free-running state of the rotor may be executed by the application of at least one 180° base voltage vector in one direction of rotation of the motor, the buffering of Hall sensor data and the application of at least one further 180° base voltage vector in the opposite direction of rotation, whereby a further read-out of data from at least one Hall sensor must differ from the buffered data.

Correspondingly, a sensor system configured for 180° block commutation can be checked by the use of base voltage vectors for the other commutation scheme concerned.

In order to avoid damage to the motor during the checking of the rotor and sensor position, the voltages applied may be limited e.g. by pulse-width modulation, whereby the current obtained, and the resulting torque delivered, are reduced accordingly. If pulse-width modulation of the supply voltage is not possible, current-limiting can be achieved by the alternating cut-in and cut-out of the voltage vector. As the magnetic field generated by the permanent magnet of the rotor, and therefore also the achievable torque, reduces as the temperature increases, this effect can be offset by an increase in the winding currents, provided that information on temperature is available. Accordingly, the control circuit may be provided with means for the determination of a temperature, whereby a specific sensor or the temperature-related properties of existing electrical components may be employed.

The control of the motor or regulation of currents may be made more difficult by tolerances in the sensor system, as the determination of the rotor angle and/or speed of rotation will be impaired by severe errors, according to the magnitude of the tolerances. These errors may be compensated by a more accurate check of the sensor positions; this can be effected if the voltages applied to the windings can be selected or adjusted individually.

If the sensor system is configured for 120°-block commutation, and a 120° base voltage vector is applied to the off-load rotor for a specific time interval, an N/S transition of the rotary encoder lies directly in front of, or in the immediate vicinity of, a Hall sensor 6. Accordingly, the rotor is close to a position in which the data from a Hall sensor will change, and a switchover of the base voltage vector applied will be required. By the angular variation of the voltage vector, either steplessly or in specific increments, the exact switching position of the Hall sensors can be determined.

As a result of the hysteresis of the Hall sensor, together with any differences in magnetic field strength associated with individual positions of the rotary encoder, the switchover point is subject to variation, depending upon the targeted position and the direction of approach applied. The hysteresis of the Hall sensor which is subject to respective is determined by the voltage vector applied being varied in one direction of rotation, either incrementally or steplessly, until such time as a switchover occurs or the position of the adjoining base voltage vector is achieved. Thereafter, the switchover point of the Hall sensor 6 is approached in the opposite direction of rotation, in order to determine the angular difference between the voltage vector at the time of switchover and the corresponding base voltage vector. In case of an overrun of the position of the base voltage vector and an approach in the opposite direction of rotation, an angular difference between the voltage vector at the time of switchover and the corresponding base voltage vector may again be determined, thereby allowing the establishment of hysteresis or switchover angle differences for the sensor concerned. By the execution of this check for all commutation positions on all pole pairs, the entire sensor system can be rated.

The method applied for the incremental or stepless variation of the voltage vector may vary, depending upon the circuit facilities available. When a dedicated circuit is available for the pulse-width modulation of all the voltages applied to the windings, known vector modulation methods, such as sine-delta modulation or space-vector modulation, may be applied. Dead-time effects may be taken into consideration by the adjustment of the pulse duty factor. Current limitation is possible by the adjustment of the intermediate circuit voltage.

If only a single pulse-width modulation circuit is available, and each phase winding can receive a positive or negative supply voltage as required, together with the output voltage of the pulse-width modulation circuit, or may remain in open-circuit conditions, the starting position is achieved by the application of a base voltage vector. From this point, the potential applied to one phase winding is varied incrementally upwards and downwards until the switching position of the associated Hall sensor is established. Where the sensors are configured for 120°-block commutation, the mean voltage, which corresponds to a 50% pulse duty factor for pulse-width modulation, may be appropriately applied to the effectively open-circuit phase winding, and the voltage applied may be varied by the adjustment of the pulse duty factor. For the purposes of current limitation, multiple zero vectors may be superimposed on the actively-applied voltage vector, whereby a positive or negative supply voltage is delivered to all the phase windings.

Where sufficiently fast-response control electronics are provided, an absent pulse-width modulation circuit may be replaced by appropriate switchover between adjoining base voltage vectors, whereby zero vectors may also be superimposed in this case for the purposes of current limitation.

A check of the sensor system may be executed upon the completion of a new drive unit for an electrically-commutated machine and a driven device. The angular correction or hysteresis of the Hall sensors thus determined may then be stored in a non-volatile memory. Upon each start-up of the system, the drive unit can complete an independent evaluation of its sensor system, and compare it with the saved values. The resulting enhanced quality of internally-measured variables permits a more accurate regulation of the drive system.

While the above description constitutes the preferred embodiment of the present invention, it will be appreciated that the invention is susceptible to modification, variation and change without departing from the proper scope and fair meaning of the accompanying claims.

The invention claimed is:

1. A method for the determination of the relative position of the rotor of an electronically-commutated synchronous machine, the machine having a stator with three phase windings, three rotor position sensors which are fixed to the stator and are configured to a commutation scheme of a first block commutation, wherein the rotor position is determined by read-out of data from the position sensors, the method comprising the steps of:
   rotating an off load rotor to a predefined angle by application of an appropriate voltage vector, the voltage vector being defined by a commutation scheme of a second block commutation after a first rotor position is determined;
   comparing a result of a second rotor position determination process with a rotor position anticipated as a result of the application of an appropriate voltage vector after the first rotor position is determined;
   determining the appropriate voltage vector by an association between the first rotor position and the voltage vector to be applied for the achievement of a desired rotation; and
   comparing the first rotor position and the second rotor position and utilizing the comparison between the first rotor position and second rotor position to improve accuracy of position identification of the rotor.

2. The method as claimed in claim 1 further comprising in that an association between the current rotor position and the appropriate voltage vector to be applied for the achievement of a desired rotation through a defined angle is determined by means of a specified first commutation scheme.

3. The method as claimed in claim 1 further comprising in that, by reference to the comparison between the result of the second rotor position determination process and the anticipated rotor position, correcting subsequently determined rotor positions and related derived variables.

4. The method as claimed in claim 1 further comprising in that, during the first rotor position determination process, the currents flowing in phase windings of the synchronous machine are subject to limitation on the basis of temperature information whereby, in case of a higher temperature, a higher limiting current is selected and, in case of a lower temperature which is less than the higher temperature, a lower limiting current which is less than the higher limiting current is selected.

5. The method as claimed in claim 1 further comprising in that, during the first rotor position determination process, the currents flowing in phase windings of the synchronous machine are limited by alternating cut-in and cut-out of the voltages applied to the phase windings.

6. The method as claimed in claim 1, further comprising in that a first commutation scheme for the synchronous machine is specified, whereby an association between the appropriate voltage vector applied and the anticipated rotor position is established.

7. The method as claimed in claim 6 further comprising in that the electronically-commutated synchronous machine is provided with the rotor being permanently-excited and the stator is provided with three phase windings, together with the three rotor position sensors in an appropriate arrangement for a first commutation scheme, wherein the first rotor position determination process is carried out by the read-out of data from the position sensors, defining the appropriate voltage vector by a second commutation scheme, and comparing the result of the second rotor position determination process with the first commutation scheme.

8. The method as claimed in claim 7 further comprising, after the comparing of the result of the second rotor position determining process with the first commutation scheme, applying the voltage vector with an angular displacement of 90° in the first commutation scheme, whereafter the voltage vector in the second commutation scheme is applied at an angle displaced by a further 90° in the same direction, and determining a third rotor position thereafter, whereby an error is detected if the data from the position sensors for the third rotor position are not inverted in relation to the data for the second rotor position determination.

9. The method as claimed in claim 7 further comprising in that at least one further voltage vector, in adjoining the opposite direction of rotation, of the second commutation scheme is applied, and determining a third rotor position thereafter, whereby an error is detected if the data from the position sensors for the third rotor position determination do not differ from the data for the second rotor position determination.

10. The method as claimed in claim 6 further comprising in that the electronically-commutated synchronous machine is provided with the rotor of a permanently-excited rotor type and the stator is provided with three phase windings, together with the three rotor position sensors in an appropriate arrangement for a first commutation scheme wherein, prior to the first of a rotor position determination, a base voltage vector for the first commutation scheme is applied, the first rotor position by the read-out of data from the position sensors, varying the appropriate voltage vector in relation to the base voltage vector by specific increments, and the second rotor position determination, together with the adjustment of the appropriate voltage vector, are continued progressively until an adjoining rotor position is indicated.

11. The method as claimed in claim 10 further comprising in that the appropriate voltage vectors are set by the use of vector modulation methods, whereby dead-time effects are compensated by the appropriate adjustment of a relevant pulse duty factor.

12. The method as claimed in claim 10 further comprising in that a limitation of current is effected by the repeated and short-term input of zero vectors.

13. The method as claimed in claim 10 further comprising in that the rotor position sensors are Hall effect devices, and the specific incremental variation of the voltage vector and the read-out of data from the position sensors are repeated, whereby the desired rotor position is achieved, in both running directions of the machine, by the application of the base voltage vector, and the existing voltage vectors at the time of a change to the data from the position sensors are compared with the base voltage vector, and a resulting measure is calculated for the hysteresis of the position sensors, the data read-outs for which have changed.

14. The method as claimed in claim 13 further comprising in that the hysteresis of all the Hall effect position sensors is determined by the application of the base voltage vector which is adjacent to the relevant switchover point, and the repeated incremental variation of the voltage vector with a simultaneous read-out from the respective one of the position sensors concerned.

15. The method as claimed in claim 14 further comprising in that the switchover positions of the respective rotor position sensor are adjusted in relation to the base voltage vector, are considered by the application of appropriate adjustments to the subsequent control of the electronically-commutated synchronous machine whereby, a positional difference or hysteresis is logged and taken into consideration for at least one of the rotor position sensors.

16. The method as claimed in claim 10 further comprising in that the appropriate voltage vectors are varied by the adjustment of one of the voltages applied by means of a pulse duty factor.

17. The method as claimed in claim 11 further comprising in that the appropriate voltage vectors are generated by means of rapid switchover between adjacent base voltage vectors.

18. A circuit arrangement for the control of an electronically-commutated synchronous machine comprising:
   a rotor,
   a stator with a three phase winding,
   three rotor position sensors fixed to the stator and in an appropriate arrangement for a commutation scheme of a first block commutation,
   the circuit arrangement configured to determine the position of the permanently-excited rotor of the electronically-commutated synchronous machine, relative to the three rotor position sensors, wherein the rotor position is determined by read-out of data from the position sensors, the circuit arrangement is furthermore configured to:
   rotate an off load rotor to a predefined angle by application of an appropriate voltage vector, the voltage vector being defined by a commutation scheme of a second block commutation after a first rotor position is determined;
   compare a result of a second rotor position determination process with a rotor position anticipated as a result of the application of an appropriate voltage vector after the first rotor position is determined;
   determine the appropriate voltage vector by an association between the first rotor position and the voltage vector to be applied for the achievement of a desired rotation; and
   compare the first rotor position and the second rotor position and utilize the comparison between the first rotor position and second rotor position to improve accuracy of position identification of the rotor.

19. The circuit arrangement as claimed in claim 18, further comprising in that on-load operation of the machine proceeds only after the error-free execution of the method in which the circuit arrangement considers any difference detected between the actual and the anticipated position of the rotor.

20. The circuit arrangement as claimed in claim 18 incorporated into a motor vehicle.

* * * * *